United States Patent [19]

Laws et al.

[11] Patent Number: 4,719,779
[45] Date of Patent: Jan. 19, 1988

[54] HEAT SHIELD ARRANGEMENTS

[75] Inventors: William R. Laws, Worcester Park; Geoffrey R. Reed, Tadworth, both of England

[73] Assignee: Encomech Engineering Services Limited, Great Britain

[21] Appl. No.: 825,888

[22] Filed: Feb. 4, 1986

[30] Foreign Application Priority Data

Mar. 26, 1985 [GB] United Kingdom ............... 8507858

[51] Int. Cl.⁴ .................. B21B 43/00; B21B 45/02
[52] U.S. Cl. ............................. 72/14; 72/202; 72/342
[58] Field of Search ............ 72/13, 14, 17, 31, 200, 72/202, 342; 29/65; 82/5, 34 A, 34 B

[56] References Cited

U.S. PATENT DOCUMENTS

| | | | |
|---|---|---|---|
| 3,010,344 | 11/1961 | Christensen | 82/5 X |
| 3,264,856 | 8/1966 | Layard | 72/202 |
| 3,344,648 | 10/1967 | Gray | 72/364 |
| 4,343,168 | 8/1982 | Laws et al. | 72/202 X |
| 4,554,812 | 11/1985 | Hirschmanner et al. | 72/202 |

FOREIGN PATENT DOCUMENTS

| | | |
|---|---|---|
| 889615 | 1/1972 | Canada . |
| 0010976 | 5/1980 | European Pat. Off. . |
| 0048503 | 3/1982 | European Pat. Off. . |
| 0141798 | 5/1985 | European Pat. Off. . |
| 45-415 | 1/1970 | Japan ............... 72/202 |
| 58-154403 | 9/1983 | Japan ............... 72/200 |

OTHER PUBLICATIONS

Patent Abstracts of Japan, vol. 7, No. 193 (M-238)[1338], Aug. 24, 1983, Kawasaki Seitetsu K. K., Title: Slow Cooler for Hot Rolled Steel Material.

Primary Examiner—E. Michael Combs
Attorney, Agent, or Firm—Larson and Taylor

[57] ABSTRACT

A heat shield arrangement for a hot-rolling mill has thin-walled heat insulating panels above below and at the sides of a hot material path through the mill. The upper and/or side panels are adjustable in position to reduce the free space around the material on said path and so improve the view factor. The upper panels are suspended from carrier frames which can be raised to lift the panels clear. With the frames lowered, the upper panels are adjustable between a raised ambush position and a fully lowered operative position. Lowering the panels from the ambush position can be triggered by sensing the presence of the material so that the panels become fully effective as a strip of hot material begins to pass under them but are held sufficiently high before threading to avoid damage from a hot strip with a distorted leading edge.

16 Claims, 12 Drawing Figures

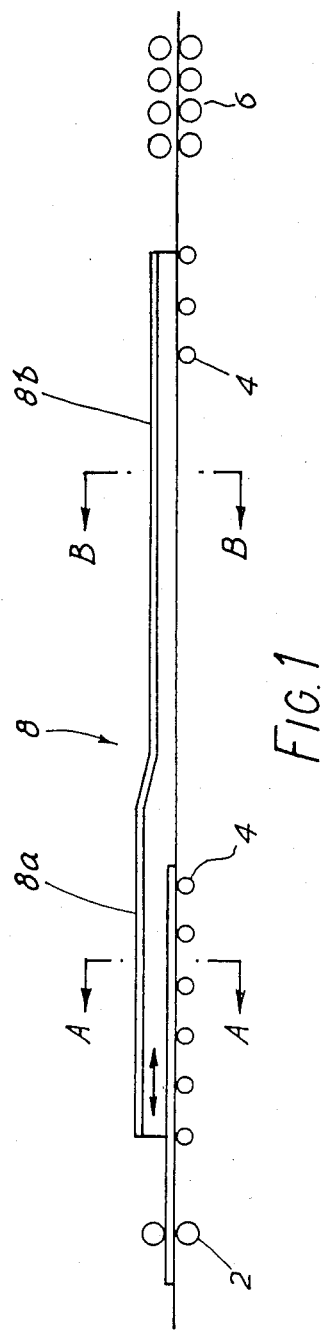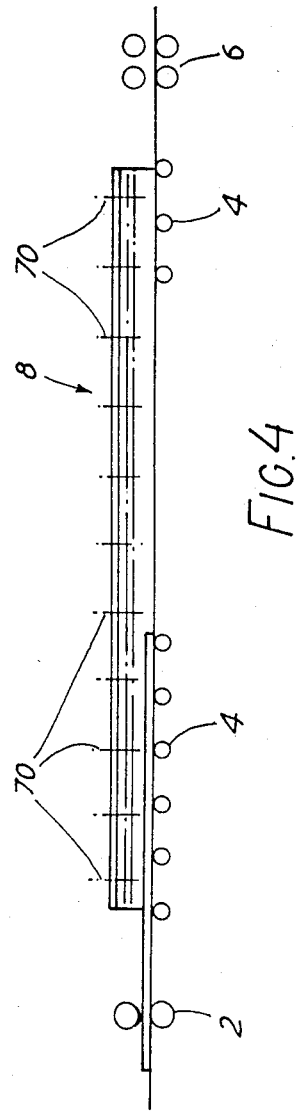

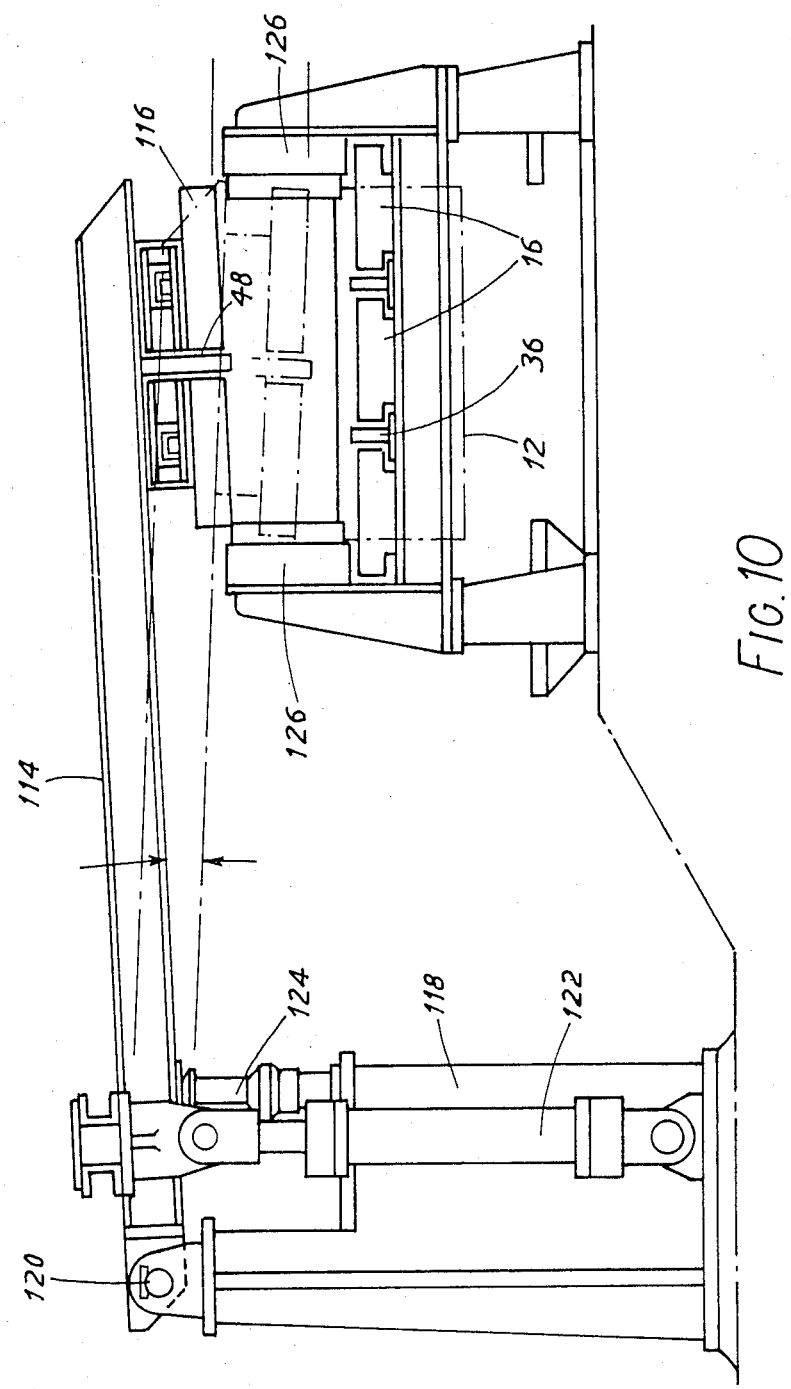

HEAT SHIELD ARRANGEMENTS

BACKGROUND OF THE INVENTION

This invention relates to heat shield arrangements for hot-rolling mills.

Such arrangements are known, e.g. from EP No. 0 010 976, comprising lightweight heat insulating panels disposed around the hot material path through the mill, e.g. including upper and lower panels above and below said path, and possibly also side panels at laterally opposite sides of said path. In that earlier patent, heat shield arrangements are described that provide a relatively restricted vertical spacing between the upper panels and the top surface of the hot material moving along the path through the mill, thereby bringing the radiating hot faces of the panels close to the surfaces of the hot material and achieving a high operational efficiency.

In practice it is found that for wide strip mills—i.e. of about 1.4 meters or greater in width, a distance of about 200 mm between the top surface of the hot metal strip and the radiating bottom face of the upper panels of the heat shield arrangement is able to provide high efficiency operation for a wide strip. If, however, narrower material is passed along the path through the mill, the thermal efficiency falls off.

This problem is felt especially in narrow strip mills which have a reversing roughing stand. It is customary to employ such mills for rolling a large range of widths—thus a mill that can roll material 700 mm wide may frequently be required to roll material as narrow as 200 mm. In the latter case a clearance of 200 mm, such as would be satisfactory for wide strip in a wide strip mill, results in a substantial loss of performance and considerably lower clearances are required to give adequate heat conservation. The problem is increased in such narrow strip mills which employ a multi-stand finishing train: the hot material passes from the roughing stand to the finishing train with a much greater thickness than the strip would have in most wide strip mills, and the finishing train entry speeds are considerably lower. As a result the tail end of the strip is held on the delay table for considerable periods, which can lead to an excessive temperature drop.

SUMMARY OF THE INVENTION

According to one aspect of the present invention there is provided a heat shield arrangement for a ho-trolling mill comprising a series of heat insulating panels including at least one upper panel located above a hot material path through the mill, and at least one further panel located at each side of said path, and means for setting the panel or panels at least at one of said locations at an adjustable distance from the material path whereby to reduce the clearance between the material and said panel or panels.

Thus, it may be arranged that the side panels can be moved towards and away from each other, inwardly below the upper panel or panels, or an upper panel or panels can be moveable downwards between the opposed side panels. There may be a number of upper panels forming a laterally spaced group which are relatively displaceable in the vertical direction; for example such a group may include at least one central panel between laterally outer panels, said central panel being displaceable downwardly below the level of said outer panels. In such an arrangement the free space around the hot material can be controlled by combined displacements of both the central upper panels and the side panels.

An improvement in efficiency is obtained both in the faster response to transient conditions when the hot material comes to the heat shield arrangement, and in the reduction of losses from the heat shield arrangement to the exterior because of its smaller surface area.

The effect of reducing the clearance on the efficiency of heat retention can be seen from consideration of the radiation view factor (F). For two similar, infinitely long strips in spaced parallel planes on opposite sides of a radiation source, the radiation view factor is given by the formula $$F = \frac{\sqrt{1 + B^2} - 1}{B}$$

where $$B = \frac{\text{width of strip}}{\text{strip separation distance}}$$

Thus, by reducing the free space between the strip and the heat source between them the view factor is increased. Preferably the means of adjustment are so arranged as to allow the view factor to be kept above 0.8.

The ability to adjust the positions of the heat insulating panels over a hot material path and so vary the free space or clearance along the path can also be utilized in a hot-rolling mill to provide a greater access space for an entering strip, whereby to minimise the risk of damage by distorted material, the free space being automatically reduced by the arrival of the front end of the strip.

Thus, according to another aspect of the invention, there is provided a heat shield arrangement for a hot-rolling mill comprising at least one series of heat insulating panels located above a hot material path through the mill where they can be raised and lowered by positioning means to adjust their distance above said path, and means sensing the arrival of hot material along said path for operating said positioning means, whereby the panels are lowered to a position closer to the material from an upper clearance or "ambush" position when the sensing means has detected the presence of the material under the panels.

If the clearance of the upper panels is to be minimised it is important that they can be raised without delay in response to any lifting of the hot material that might damage the thin metal membranes which form the hot faces of the panels. At the same time, it is desirable to ensure that they are not raised unnecessarily and a hold-down force may normally be applied to the upper panels, as is described in EP No. 0 010 976.

According to a further aspect of the present invention, a heat shield arrangement for a hot-rolling mill has a group of upper heat insulating panels mounted on support means provided with a drive for lifting said upper panels away from the hot material path beneath them, and a stored energy device is engageable with said support means when the upper panels are in a lowered position, said device applying an upwards force to said support means acting against the force applied by the drive when the panels are being held by the drive in their lowered position but complementing the drive force when the drive is operated to initiate lifting of said panels.

In this way, an additional power source can be disposed in close proximity to the upper panels to accelerate them more rapidly upwards when detecting means indicate that they are endangered by lifting or upward distortion of the hot material.

The stored energy device may conveniently be provided in the form of a resilient cushioning device, for example a pneumatic accumulator.

The hot material being processed may also suffer lateral distortion. In particular, when roughing mill stands are being set up during the start of operations, the breakdown bar being processed may be given a "banana shaped" distortion during rolling. Such a bar will not run along the roller table and in a conventional installation it will be allowed to skid off the open side of the roller table. If the material path is enclosed by heat insulating panels, that is no longer possible and there is a risk of damage to the side panels.

In one measure according to the present invention, at least some of the side panels are provided with contact elements in the form of rollers mounted on upwardly extending axes, for deflection of any laterally displaced bar of hot material. These contact rollers may be constructed with a thin-walled high-temperature metal shell enclosing a ceramic fibre core, analogous to the panels themselves so that they do not disturb unduly the thermal characteristics of the side panels.

In a further preferred feature, however, at least at one side of the material path there is at least one heat insulating panel that is displaceable to a position in which said path is opened to the exterior. The misshaped bar can then leave the roller table in exactly the same manner as in conventional installations. Such displacement of one or more side panels can be effected entirely passively by the lateral force of a displaced bar, or it can be power-assisted, e.g. a displacement drive being actuated in an analogous manner to the drive raising the upper panels to keep them from damage.

Some embodiments of the invention will be described in more detail, by way of example, with reference to the accompanying drawings.

BRIEF DESCRIPTION OF THE DRAWINGS

FIG. 1 is a schematic side elevation of a strip mill with a reversing roughing stand, FIG. 4 is a schematic side elevation of a strip mill similar to FIG. 1, FIG. 10 is another transverse cross-section illustrating a further adjustment mechanism for the spacing of the upper heat insulating panels.

DESCRIPTION OF THE PREFERRED EMBODIMENTS

In FIG. 1, a narrow strip mill is shown comprising a reversing roughing stand 2 and a roller table 4 defining a material path from the roughing stand to a multi-stand train 6 of finishing rolls arranged in series. A tunnel-form heat shield 8 encloses the roller table to conserve the heat in the material between rolling stages. The shield is made up of thin-walled panels, e.g. as described in GB No. 1 603 428, disposed above, below and at the sides of the path of the steel bar or strip along the roller table. Approximately the first third of the length of the tunnel is of increased height, this forming a region 8a for holding the transfer bar being worked before it is returned through the roughing stand for further roughing passes.

Figure 2:
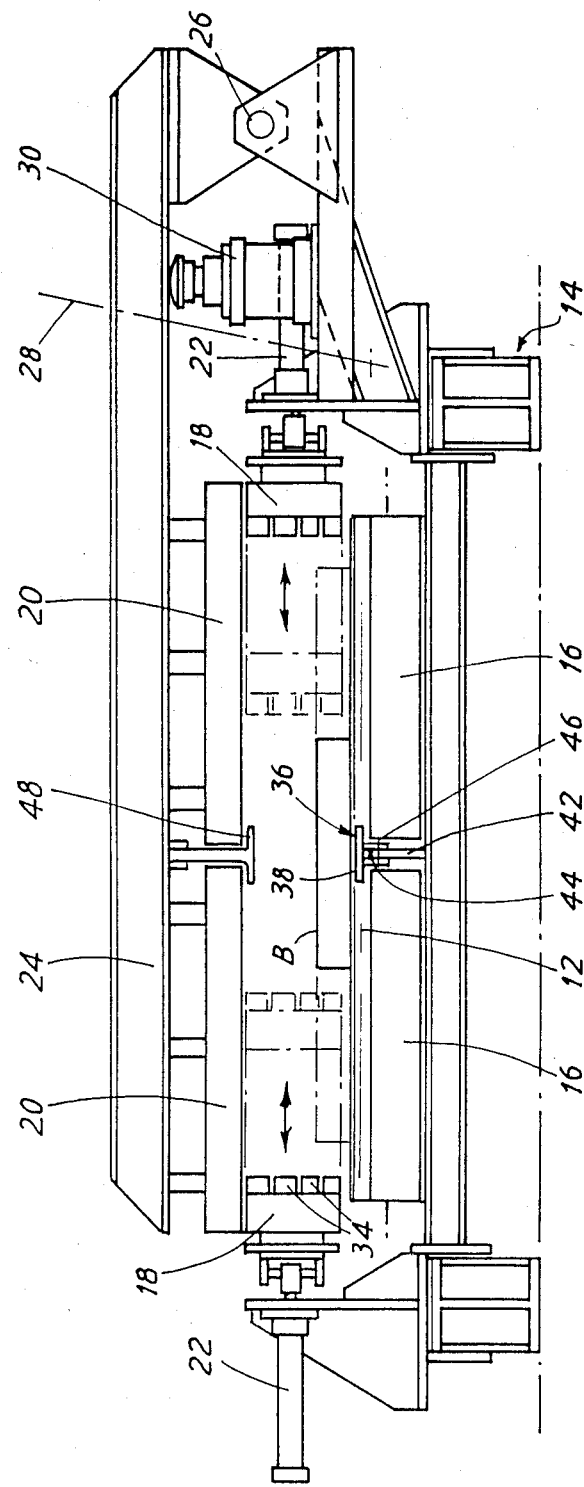
FIGS. 2 and 3 are transverse sections on the lines A—A and B—B in FIG. 1, FIGS. 3a and 3b are side and plan views illustrating the upper heat shield panels and their adjustment means in the region shown in FIG. 3.

In this first region 8a of the heat shield the panels are disposed as shown in FIG. 2. The roller table rollers 12 are mounted in a base structure 14 with lower insulating panels 16 interposed between successive rollers. Further series of insulating panels 18, 20 are provided at the sides and above the roller table respectively.

The lower panels 16 are in fixed positions. The side panels 18 are mounted on the frame 14 through laterally projecting pressure-fluid, e.g. hydraulic, cylinders 22 by the use of which they can be moved between outermost positions shown in full lines in FIG. 2 and innermost positions shown in broken lines. The upper panels 20 are suspended from a carrier frame 24 having pivot connections 26 with the base structure 14 to one side of the roller table and displaceable by further pressure-fluid cylinders (indicated only by their longitudinal axes 28) between the base structure and the pivotable carrier frame. When a carrier frame, with its upper panels, is in the operative position illustrated it is supported by cushioning stops 30 adjacent the beam pivot connections 26. The stops 30 set the position of minimum clearance of the upper panels from the material being rolled, this being only sufficient to allow the material to move freely laterally.

The roller table within the first region of the heat shield holds the transfer bar B between successive roughing passes through the stand 2 to reduce its thickness. It is inconvenient to lower the upper panels 20 to match the progressive change in shape in this sequence. A considerable improvement in performance can be obtained, however, by arranging that the side panels 18 are displaceable inwards, underneath the upper panels. Bumper bars 34 in the form of semi-cylindrical metal bolsters are mounted between the side panels to project in front of their inner, hot faces and when the transfer bar arrives on the table between roughing passes the panels are moved inwards by the cylinders 22 to contact the bar. Pressure control valves (not shown) are provided to allow the cylinders 22 to yield when force is applied to the side panels so that they move inwards and outwards to accommodate any lateral misshaping of the steel bar as it passes them.

The lower panels 16 are arranged in pairs separated along the centre of the table by a bumper or fender bar 36 between each successive pair of rollers, intended to protect the lower panels from damage. Because of the possibility that during the initial passes at least, the relatively thick and narrow transfer bar may tend to move off centre the bumper bar 36 comprises a wide-topped T-plate wearer bar 38 with slots extending obliquely forwards from its side edges in the direction of material travel, to allow for longitudinal expansion of the top section of the wearer bar as this will reach the temperature of the transfer bar B. Each T-plate is on a fixed support 42 but insulated from it by a ceramic fibre packing 44, and the T-plate is connected to its support by pins 46 allowing relative thermal expansion therebetween.

The upper panels 20 are similarly divided by a central bumper bar 48 which, if struck by the hot material, actuates the lifting of the panels by their pressure cylinders, as is described in EP No. 0 010 976. There are a number of separate groups of upper panels on respective carrier frames along the length of the roller table, e.g. each with their own lifting mechanism, and it is possible to arrange that the operation of one bumper bar to raise the panels of its group will cause the raising of the subsequent upper panel groups to be actuated one after another, along the remaining length of the table. The upper panels are thereby protected against damage from distorted hot material without requiring the large peak power supply that would be needed if they were raised simultaneously.

Each cushioning stop 30 comprises a pressure accumulator that is pressurised by the weight of the carrier frame and its attachments when the upper panels are in their operative position. These stops can be arranged to counterbalance some or all of this weight and may even be so arranged that some downwards pressure must be provided from the carrier frame lifting cylinders in order to hold the upper panels fully lowered, so that the lifting movement can be initiated more rapidly when the upper panel bumper bars are operated, without increasing the maximum power requirement. The cushioning stops can also have adjustable end limit settings (not shown) to provide a convenient means of determining the lowered positions of the upper panels for minimum safe clearance with the side panels—i.e. allowing free movement of the side panels but minimising radiation losses through the inevitable clearance gap.

Figure 3:
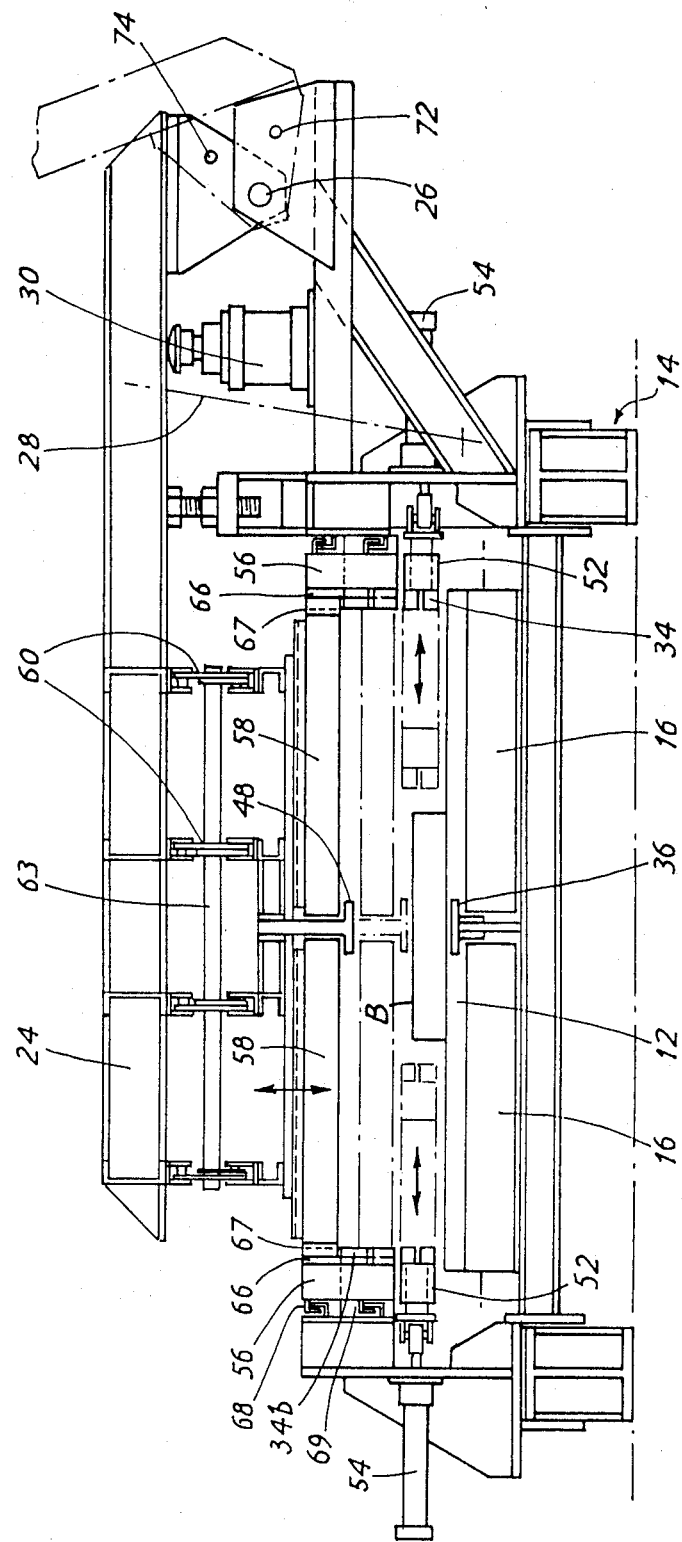
Figure 3A:
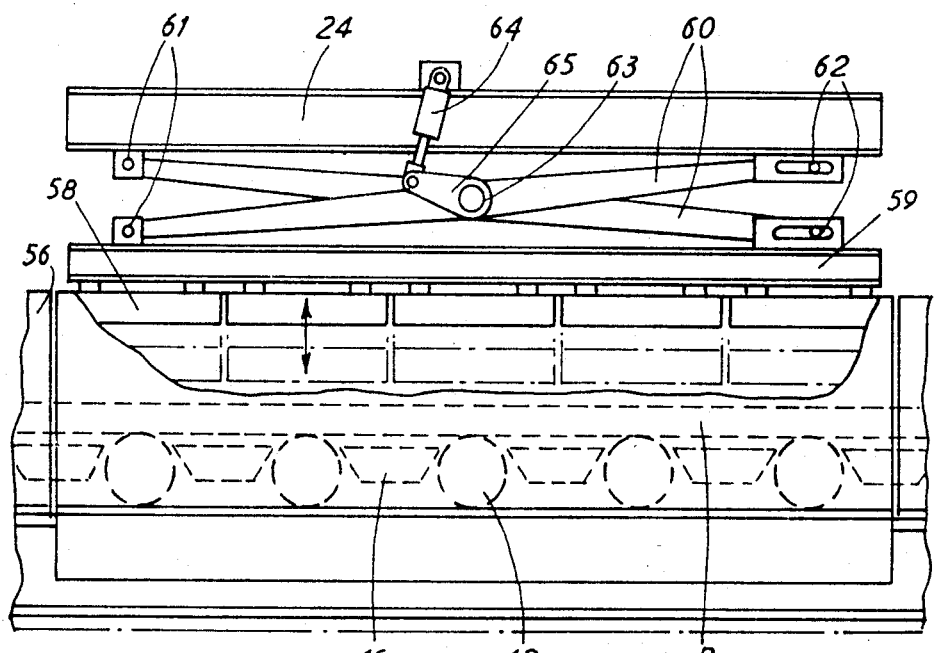
Figure 3B:
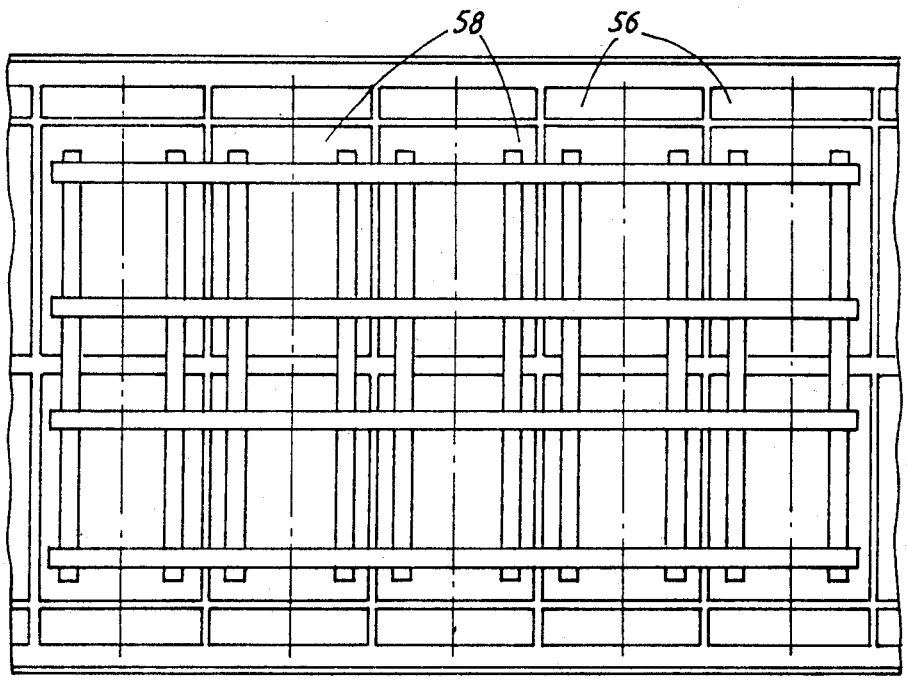

In the remaining region 8b of the heat shield beyond the part of the roller table occupied by the hot material between roughing passes, the disposition of the panels can be as shown in FIG. 3. The configuration of the bottom panels is as already described but there are differences in the side and upper panels. Each side boundary of the tunnel-form enclosure is now composed of a lower side panel 52 mounted on laterally extending fluid-pressure cylinders 54 in the same manner as the panels 18 in the earlier region 8a of the heat shield, and an upper side panel 56 held fixed on the main frame. The panels 58 over the top of the material path are grouped on sub-frames 59 (FIG. 3a) to extend over short lengths of the roller table and the sub-frames are displaceably supported from the associated carrier frame 24 through a linkage comprising pairs of scissors links 60 having fixed and slotted pivot connections 61, 62 at their opposite ends. At their centres a torque shaft 63 extends transversely through the links and is rotationally fixed to a corresponding link of each pair of links. A fluid pressure actuator 64 mounted on the carrier frame 24 engages a crank 65 secured to the shaft 63 to rotate it, and thereby also the links fixed to the shaft, to raise and lower the upper panels. The position of the upper panels can thus be adjusted to bring them closer to the hot material while the frame 24 remains in its lowered position. Bumper bars 48 are provided here, as before, to actuate the raising of the upper panels when necessary to avoid damage.

As illustrated in broken lines in FIG. 3, both the lower side panels 52 and the upper panels 58 can be brought towards the material B on the table to reduce the free space around it. To limit radiation losses between the upper panels and the fixed side panels, the upper panels can be lowered between the side panels 56. The hot faces of the side panels have shaped vertical slots 66 in line with the fixed side bumper bars 34b and the upper panel side edges have tongues 67 that project into the slots, so that the upper panels can pass down over the the side bumper bars while leaving only a small clearance to prevent heat losses. The side panels 56 are mounted to the side frame with clips 68 while the bumper bars 34b are rigidly fixed to the side mounting frame by flanged supports 69.

The lower side panels 52 are adjusted by bringing their bearer bars into contact with the side edges of the material as already described. The upper panels 58 can then be lowered until they come into contact with the lower side panels.

These movements of the adjustable panels can be triggered by heat detection means that sense the arrival of the hot material B in the region enclosed by the panels; such an arrangement is illustrated in FIG. 4 as a modified version of the rolling mill layout of FIG. 1, and like that example there are unillustrated side and bottom heat insulating panels as well as the upper panels 8 along the length of the roller table 4. Heat sensors 70, which are not indicated in any detail as they can be conventional units, are set at regularly spaced positions along the length of the roller table 4 and control the operation of the actuators 64 for the upper panels of the associated regions along the table length. Once the carrier frames have been lowered to dispose the upper panels generally horizontally over the roller table, the sensors hold the upper panels in an "ambush" position as is shown in full lines in FIGS. 3 and 3a, in readiness for the movement of the hot material onto the table. As the leading edge of the material reaches each sensor, its actuator 64 is operated and the corresponding section of upper heat shield panels drops to the fully lowered position shown in broken lines. In this way it is possible to minimise the risk of damage due to lifting of the front end of the hot material without requiring the upper panels to be maintained at a height at which the view factor is relatively small.

It will be understood without further illustration that it is possible to employ other sensing means for detecting the arrival of the hot material, in particular radiation sensing means of which the heat sensors are an example.

The mechanisms raising the carrier frames can be actuated through the upper panel bumper bars 48 in the manner already described and FIG. 3 shows the use of the same cushioning stops 30. FIG. 3 also shows a safety device which can similarly be provided in the earlier region of the roller table for retaining each carrier frame in its fully raised position, e.g. for servicing, this comprising a locking pin 72 displaceable in the fixed mounting of the bar to engage a registering aperture 74 in the raised bar. The pin must be withdrawn from that aperture by fluid pressure before the carrier frames can be lowered.

Figure 5:
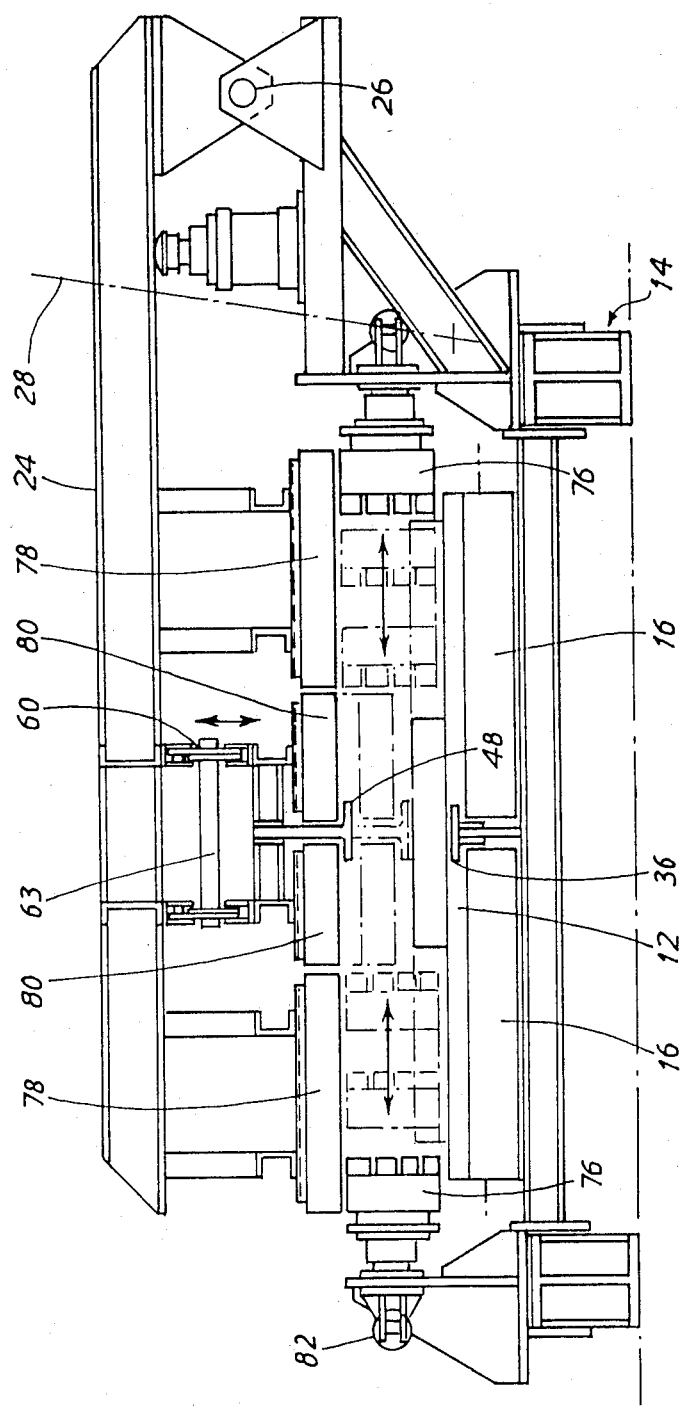
FIG. 5 illustrates a modified form of the adjustment means shown in FIGS. 2 and 3, FIGS. 6 and 7 are two views of a contact roller for protection of a heat insulating side panel.

An alternative way of providing adjustable upper and side panels is shown in FIG. 5. In this case the side panels 76 are full-height units, as in the example of FIG. 2, but the upper panels on each side of their central bumper bar 48 are divided into an outer fixed panel 78 and an inner panel 80 displaceable up and down by the same form of linkage 60 as the upper panels in FIG. 3. FIG. 5 illustrates the side panels 76 being placed in any of three pre-set positions (further positions can be provided if required) by appropriate control of fluid pressure driving cylinders 82 instead of relying on abutment with the hot bar B for their location. A further modification is shown in FIG. 5 in that the pressure cylinders 82 for movement of the side panels have their longitudinal axes in the direction of travel along the table to achieve a more compact layout, and are connected to the panels through suitable linkages.

Figure 6:
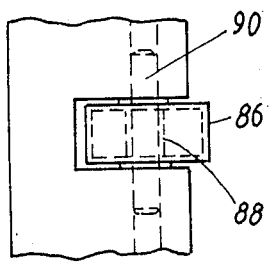
Figure 7:
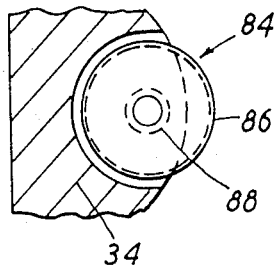

For use in place of the sliding-contact bumper bars already described, FIGS. 6 and 7 show a contacting element in the form of a roller 84 comprising a thin-walled heat-resistant metal shell 86 and boss 88, filled with ceramic fibre insulation and held in a spindle 90 loosely mounted in bearings in the bumper bar 34 with its axis transverse to the travel direction along the roller table. A bumper bar may have a series of such rollers mounted on it at spaced points along its length or rollers may be individually mounted directly onto a side panel. The provision of such rollers is particularly suitable for the side panels where the operating procedures result in frequent and prolonged contact with the hot material moving along the table.

Figure 8:
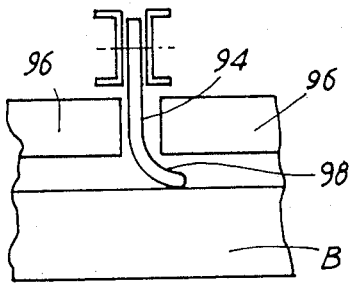
FIG. 8 is a detail illustration in a vertical longitudinal plane of a protective device for the upper panels.

FIG. 8 illustrates as an additional protective measure a transversely extending bumper bar 94 that may be placed in front of some or all of the upper panels 96, the lower end 98 of the bar being curved forwards under the edge of the following panel. Like the central longitudinal bumper bars 48, the transverse bar 94 can be arranged to actuate the lifting of the upper panels to prevent them being damaged.

Figure 9:
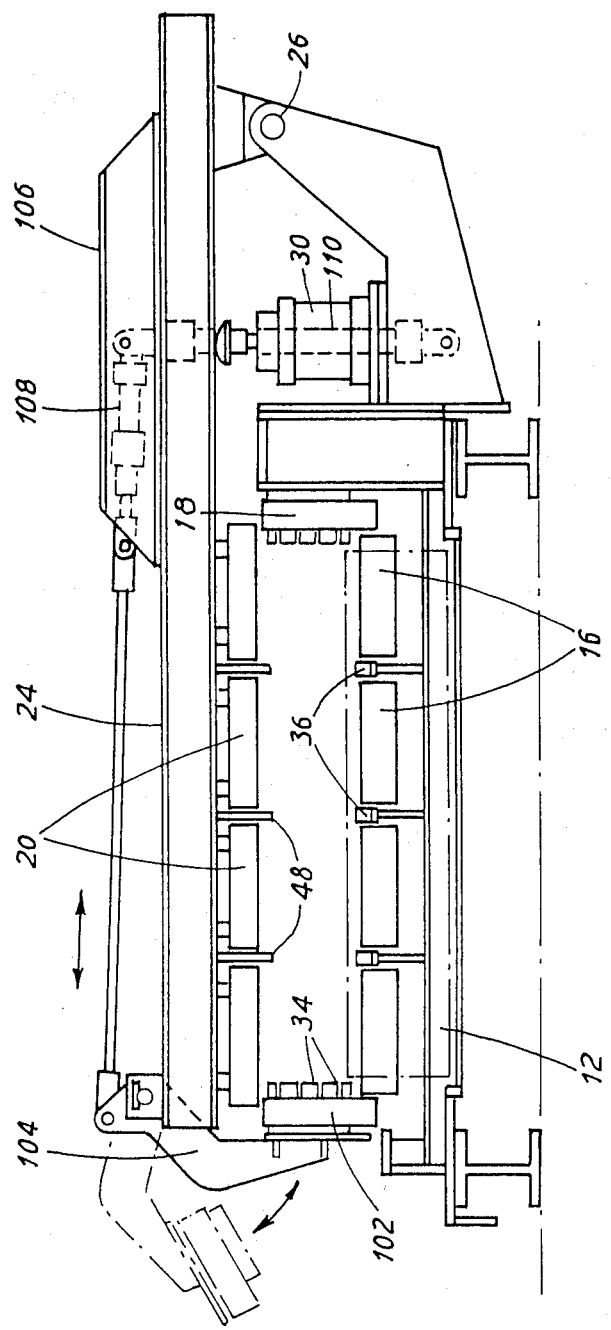
FIG. 9 is a further transverse cross-section showing a heat shield arrangement with means for allowing laterally distorted material to be run off a roller table.

FIG. 9 shows a further protective device which is particularly useful if there is a tendency for distortion of the breakdown bars to occur during start-up periods when the roughing mill stands are being re-set. Where this occurs in normal practice with a conventional open roller table, a "banana shaped" bar can slide off the side of the table. With the enclosed path roller table shown in FIG. 9, the side panels 102 with their bumper bars 34 are mounted on lever arms 104 which are pivoted on a top frame 106 that comprises the carrier frames 24 carrying the upper panels. A linkage to the lever arms 104 from a further pressure-fluid cylinder 108 allows the side panels to be independently raised so that an opening is provided through which a side push-off can discard reject bars. It is also possible to provide such a pivoted side panel without a lifting drive so that it is simply swung up by the force of a reject bar against it to allow the bar to fall from the roller table.

FIG. 9 also illustrates, for raising the carrier frames, the pressure cylinders 110 with their axes parallel to the cushioning devices.

FIG. 10 illustrates a further modified arrangement according to the invention in which the lifting beams 114 from which the upper panels 116 are suspended are themselves supported on columns 118 at some distance from the roller table through pivots 120 about which they are displaceable by lifting cylinders 122. Such distancing of the supports may be required where, for example, line shaft drives prevent the upper panel support frame and lifting pressure cylinders being placed close to the table. Because of the long pivot arm, there is a relatively small angular movement when the panels 116 are raised and lowered and it is therefore possible to use cushioning stops 124 similar to the stops 30 for setting the height of the upper panels also. The side panels 126 are therefore spaced apart sufficiently to allow the upper panels to move between them, the top and bottom positions of the panels 116 being shown in full lines and broken lines respectively. This method of adjusting the upper panels can of course be applied to the arrangements shown in FIG. 3 or FIG. 5.

We claim:

1. A heat shield arrangement for a hot-rolling mill having a hot material path along its length, said arrangement comprising at least one carrier frame extending transversely across the material path, at least one series of upper heat insulating panels suspended from said at least one carrier frame and located above the hot material path, positioning means acting on said at least one frame for raising and lowering said panels jointly with said frame to adjust the distance of said panels above said hot material path between an operative clearance position close to said material path and a higher raised position substantially vertically above said clearance position, and means sensing the arrival of hot material along said path and for operating said positioning means such that the panels are lowered to a said operative position closer to the material from a said higher position in response to said sensing means sensing the presence of the material under the panels.

2. A heat shield arrangement according to claim 7 wherein further series of heat insulating side panels are disposed at opposite sides of said path and the said at least one series of panels above the path are displaceable downwards between said panels at the sides.

3. A heat shield arrangement according to claim 1 wherein further series of heat insulating side panels are disposed at opposite sides of said path and there are means for displacement of said further series of panels inwardly below the panels above the path to adjust the spacing between said further series of panels.

4. A heat shield arrangement according to claim 3 wherein there are higher and lower series of side panels on each side of the material path, the higher panels at opposite sides of the path being fixed in position at a spacing that permits said at least one series of upper panels to be displaced downwards between them, and the lower side panels being displaceable inwardly to a lesser spacing, below said at least one series of panels.

5. A heat shield arrangement for a hot-rolling mill having a hot material path along its length, said arrangement comprising at least one series of upper heat insulating panels, at least one carrier frame for suspending said series of panels above the hot material path, positioning means between said at least one carrier frame and said panels for raising and lowering the panels on said frame in a substantially vertical direction so as to vary the position of said panels above said hot material path between a first operative position close to the hot material path but above the nominal height of the hot material and a second raised position at a greater spacing from the hot material path, and means for sensing the arrival of hot material along said path and for operating said positioning means to provide lowering of the panels to a said operative position closer to the material from a said raised position responsive to said sensing means sensing the presence of the material under the panels.

6. A heat shield arrangement for a hot-rolling mill having a hot material path along the length thereof, said arrangement comprising a series of heat insulating panels including at least one upper panel located above the hot material path through the mill, and at least one further panel located at each side of said path, respective supporting means for said at least one upper panel and the said at least one further panel located at each side of said path, adjustment means for displacing said respective supporting means towards and away from the hot material path so as to vary the positioning of said panels relative to the material path between an operative position close to the hot material path and a clearance position spaced further from the said path wherein the panels surround at least a substantial part of the sides and top of the hot material path, said arrangement further comprisng sensing means for sensing the arrival of hot material along said path under the upper panels and for actuating said adjustment means to provide positioning each of said panels in a said operative position close to said path responsive to said sensing means sensing the presence of the hot material under the panels.

7. A heat shield arrangement according to claim 6 wherein said further panels are disposed at opposite sides of said path and wherein said adjustment means comprises displacement means for said further panels for moving the further panels towards and away from each other, inwardly below said at least one upper panel.

8. A heat shield arrangement according to claim 6 wherein said further panels are disposed at opposite sides of said path and said adjustment means comprises displacement means for said at least one upper panel to move it downwards between said further panels.

9. A heat shield arrangement according to claim 6 comprising a plurality of said upper panels, at least some of the upper panels being disposed in a laterally spaced group and said adjustment means comprising means for displacing at least one panel of the group in the vertical direction.

10. A heat shield arrangement according to claim 9 wherein said group of panels comprises at least one central panel disposed between laterally outer panels and being displaceable downwardly below the level of said outer panels.

11. A heat shield arrangement according to claim 6 wherein at least one said further panel is provided with contact elements in the form of rollers mounted on upwardly extending axes for protection of the panel against impact by the hot material on said path.

12. A heat shield arrangement according to claim 6 wherein at least one further panel is displaceable to a position in which the material path is opened to the exterior.

13. A heat shield arrangement according to claim 6 wherein a transversely extending abutment member is located in front of at least one of the upper panels to protect said panel from impact by the hot material.

14. A heat shield arrangement for a hot-rolling mill having a hot material path to be shielded by said arrangement, said arrangement comprising a group of upper heat insulating panels over said path, support means on which said panels are mounted, a drive mechanism for said support means for lifting the upper panels away from the hot material path to a raised position above the path and for lowering the upper panels to a lowered position close to said path sensing means for sensing the arrival of hot material along said path under the upper panels and for actuating said drive mechanism to provide lowering of said upper panels to said lowered position close to said path responsive to said sensing means sensing the presence of the hot material under the panels, a stored energy device, arranged for engagement with said support means when the upper panels are in a lowered position close to said path, for applying an upwards force to said support means which acts against the force applied by the drive mechanism when the panels are being held by the drive mechanism in their lowered position, and which complements the drive force applied by the drive mechanism when the drive mechanism is actuated to initiate lifting of said panels to said raised position vertically above said lowered position.

15. A heat shield arrangement according to claim 14 wherein stored energy device comprises a resilient cushioning device.

16. A heat shield arrangement according to claim 15 wherein said cushioning device comprises end limit means for determining the fully lowered position of the upper panels.

* * * * *